(12) United States Patent
Oh

(10) Patent No.: US 11,884,267 B2
(45) Date of Patent: *Jan. 30, 2024

(54) SYSTEM FOR AVOIDING BLIND SPOT OF VEHICLE USING ACCIDENT HISTORY INFORMATION AND METHOD THEREOF

(71) Applicant: Hyundai Mobis Co., Ltd., Seoul (KR)

(72) Inventor: Jun Hyeong Oh, Yongin-si (KR)

(73) Assignee: Hyundai Mobis Co., Ltd., Seoul (KR)

(*) Notice: Subject to any disclaimer, the term of this patent is extended or adjusted under 35 U.S.C. 154(b) by 15 days.

This patent is subject to a terminal disclaimer.

(21) Appl. No.: 17/351,516

(22) Filed: Jun. 18, 2021

(65) Prior Publication Data

US 2021/0394750 A1    Dec. 23, 2021

(30) Foreign Application Priority Data

Jun. 18, 2020   (KR) .................. 10-2020-0074241

(51) Int. Cl.
*B60W 30/095*    (2012.01)
(52) U.S. Cl.
CPC ..... *B60W 30/0953* (2013.01); *B60W 2300/10* (2013.01); *B60W 2300/12* (2013.01);
(Continued)
(58) Field of Classification Search
CPC .......... B60W 30/095; B60W 30/0953; B60W 40/06; B60W 40/072; B60W 40/076;
(Continued)

(56) References Cited

U.S. PATENT DOCUMENTS 9,180,882 B1 *  11/2015  Dolgov ............. B60W 30/09
9,487,212 B1 *  11/2016  Adam ............... B60W 30/16
(Continued)

FOREIGN PATENT DOCUMENTS

CN    107867227 A    4/2018
CN    109501798 A    3/2019
(Continued)

OTHER PUBLICATIONS

English translation of foreign publication JP2019053476 (Year: 2019).*
(Continued)

*Primary Examiner* — Russell Frejd
*Assistant Examiner* — Brandon Z Willis
(74) *Attorney, Agent, or Firm* — NSIP Law

(57) ABSTRACT

A system for avoiding blind spot using accident history information, includes an image sensor configured to provide image information by acquiring a surrounding image of a host vehicle, and a vehicle controller. The vehicle controller is configured to detect, through the image sensor, an adjacent vehicle traveling adjacent to the host vehicle and a license plate of the adjacent vehicle; determine a dangerous level of the blind spot of the adjacent vehicle, based on accident history information of the adjacent vehicle and driver tendency information of a driver of the adjacent vehicle obtained by inquiring about the license plate of the adjacent vehicle, after determining a blind spot range of the adjacent vehicle; and generate a path in which the host vehicle deviates from the blind spot or avoids the blind spot to reduce the dangerous level of the blind spot, based on a traveling situation of the host vehicle.

20 Claims, 12 Drawing Sheets

(52) U.S. Cl.
CPC ... *B60W 2420/42* (2013.01); *B60W 2530/201* (2020.02); *B60W 2540/043* (2020.02); *B60W 2554/4041* (2020.02); *B60W 2554/4046* (2020.02); *B60W 2556/10* (2020.02); *B60W 2720/106* (2013.01); *B60W 2720/125* (2013.01)

(58) Field of Classification Search
CPC ......... B60W 60/0011; B60W 2300/10; B60W 2300/12; B60W 2420/42; B60W 2420/403; B60W 2530/201; B60W 2556/10; B60W 2540/043; B60W 2540/30; B60W 2552/15; B60W 2552/20; B60W 2552/30; B60W 2554/4023; B60W 2554/4046; B60W 2554/4041; B60W 2554/4048; B60W 2720/106; B60W 2720/125; G06V 20/58; G06V 20/62; G06V 20/625
See application file for complete search history.

(56) References Cited

U.S. PATENT DOCUMENTS

| | | | | |
|---|---|---|---|---|
| 11,046,310 | B2* | 6/2021 | Yoo | B60W 10/04 |
| 11,198,437 | B2* | 12/2021 | Singh | G08G 1/017 |
| 2009/0037088 | A1* | 2/2009 | Taguchi | B60W 30/095 |
| | | | | 701/1 |
| 2015/0317523 | A1* | 11/2015 | Clark | G08B 21/02 |
| | | | | 348/148 |
| 2018/0033327 | A1 | 2/2018 | Nishijima et al. | |
| 2018/0082589 | A1* | 3/2018 | Park | B60W 30/0956 |
| 2019/0088138 | A1 | 3/2019 | Kang | |
| 2019/0263401 | A1 | 8/2019 | Yoo et al. | |
| 2020/0168098 | A1 | 5/2020 | Huang | |
| 2020/0398848 | A1 | 12/2020 | Singh et al. | |
| 2021/0199463 | A1* | 7/2021 | Kitahara | G01C 21/3815 |

FOREIGN PATENT DOCUMENTS

| | | | |
|---|---|---|---|
| CN | 109532829 A | | 3/2019 |
| CN | 109690657 A | | 4/2019 |
| CN | 111204333 A | | 5/2020 |
| JP | 2019053476 | * | 4/2019 |
| KR | 10-2009-0055907 A | | 6/2009 |
| KR | 10-1605660 B1 | | 3/2016 |

OTHER PUBLICATIONS

Chinese Office Action dated May 25, 2023, in counterpart Chinese Patent Application No. 202110680260.8 (12 pages in English, 13 pages in Chinese).

* cited by examiner

SYSTEM FOR AVOIDING BLIND SPOT OF VEHICLE USING ACCIDENT HISTORY INFORMATION AND METHOD THEREOF

CROSS-REFERENCE TO RELATED APPLICATION

This application claims the benefit under 35 USC 119(a) of Korean Patent Application No. 10-2020-0074241, filed in the Korean Intellectual Property Office on Jun. 18, 2020, the entire disclosure of which is incorporated herein by reference for all purposes.

TECHNICAL FIELD

The present disclosure relates to a system for avoiding a blind spot of a vehicle using accident history information and a method thereof, and more particularly to a system for avoiding a blind spot of a vehicle using accident history information, capable of determining a dangerous level of a blind spot of a large vehicle, and reflecting the dangerous level to a traveling path of a host vehicle, thereby preventing an accident from occurring due to the blind spot of the large vehicle, and a method thereof.

BACKGROUND

In general, a driver has to determine a traffic situation during driving of a vehicle and to drive the vehicle. In particular, the driver has to drive the vehicle by appropriately detecting a surrounding vehicle.

However, the driver may sense only a limit area due to the structural limitation of the vehicle.

The limit area refers to a side area, which is sensed by the driver through a side view mirror, and a blind spot, which is sensed as the driver turns the head of the driver and is an area other than the side area.

Although a blind spot detection (BSD) system has been developed such that the driver recognizes the blind spot through a sensor, all vehicles are not equipped with the BSD system.

Accordingly, although a host vehicle is equipped with the BSD system, a next-lane vehicle, which is not equipped with the BSD system and positioned on a next lane, may still change the lane while failing to recognize the host vehicle positioned in a blind spot of the next-lane vehicle, and the host vehicle has to avoid the blind spot and travel.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

In one general aspect, a system for avoiding a blind spot using accident history information, includes an image sensor configured to provide image information by acquiring a surrounding image of a host vehicle, and a vehicle controller. The vehicle controller is configured to detect, through the image sensor, an adjacent vehicle traveling adjacent to the host vehicle and a license plate of the adjacent vehicle; determine a dangerous level of the blind spot of the adjacent vehicle, based on accident history information of the adjacent vehicle and driver tendency information of a driver of the adjacent vehicle obtained by inquiring about the license plate of the adjacent vehicle, after determining a blind spot range of the adjacent vehicle; and generate a path in which the host vehicle deviates from the blind spot or avoids the blind spot to reduce the dangerous level of the blind spot, based on a traveling situation of the host vehicle.

The vehicle controller may include a blind spot range generator configured to detect the adjacent vehicle traveling adjacent to the host vehicle, based on the image information received through the image sensor, and determine a default blind spot range; a traveling road information generator configured to provide, as traveling road information, information on a road on which the host vehicle is travelling, based on the image information; a blind spot range changing device configured to change the default blind spot range, based on the traveling road information; a blind spot dangerous level determining device configured to determine the dangerous level of the blind spot by matching a dangerous level of the adjacent vehicle, deduced by analyzing the accident history information of the adjacent vehicle and the driver tendency information of the driver of the adjacent vehicle, with the default blind spot range changed based on the traveling road information; and a path generator configured to generate the path for minimizing the dangerous level of the blind spot, based on the traveling situation of the host vehicle and to longitudinally or laterally control the host vehicle.

The blind spot range generator may include an object type determining device configured to determine a type of the adjacent vehicle, based on the image information; an object size determining device configured to calculate a size of the adjacent vehicle, based on the image information; a host vehicle information storage configured to store data of the host vehicle, including a total height of the host vehicle and a roof area of the host vehicle; and a blind spot range determining device configured to determine the default blind spot range, based on any one or any combination of any two or more of the type of the adjacent vehicle, the size of the adjacent vehicle, the total height of the host vehicle, and the roof area of the host vehicle.

The blind spot range determining device may select one of blind spots stored depending on types of adjacent vehicles, based on the determined type of the adjacent vehicle; match the selected blind spot with the detected adjacent vehicle; and determine the blind spot range matched with the adjacent vehicle, based on any one or any combination of any two or more of the determined size of the adjacent vehicle, the total height of the host vehicle, and the roof area of the host vehicle to determine the default blind spot range.

The blind spot dangerous level determining device may determine the dangerous level of the blind spot by matching the dangerous level of the adjacent vehicle, deduced by using the accident history information, including a number of times of accidents, an accident type, and an accident scale, of the adjacent vehicle, and the driver tendency information of the driver of the adjacent vehicle received from an information providing server, with the default blind spot range changed based on a traveling path of the host vehicle and a traveling path of the adjacent vehicle.

The vehicle controller may be further configured to accelerate the host vehicle to deviate the host vehicle from the blind spot range, when the dangerous level of the blind spot and the dangerous level of the adjacent vehicle are higher than a specific reference, and when the host vehicle travels within the blind spot range of the adjacent vehicle.

The vehicle controller may be further configured to generate a path of passing through a safer blind spot by determining the dangerous level of the blind spot and the dangerous level of the adjacent vehicle, when the host vehicle avoids the blind spot of the adjacent vehicle by passing through the blind spot of the adjacent vehicle.

The adjacent vehicle may be larger than the host vehicle.

The adjacent vehicle may be a truck or a bus.

In another general aspect, a method for avoiding a blind spot using accident history information, includes providing image information by acquiring a surrounding image of a host vehicle through an image sensor; detecting, by a vehicle controller, an adjacent vehicle traveling adjacent to the host vehicle and a license plate of the adjacent vehicle; determining a dangerous level of the blind spot, based on accident history information of the adjacent vehicle and driver tendency information of a driver of the adjacent vehicle obtained by inquiring about the license plate of the adjacent vehicle, after determining a blind spot range of the adjacent vehicle; and generating a path in which the host vehicle deviates from the blind spot or avoids the blind spot to reduce the dangerous level of the blind spot, based on a traveling situation of the host vehicle.

The detecting, by the vehicle controller, of the adjacent vehicle may include detecting, by a blind spot range generator, the adjacent vehicle traveling adjacent to the host vehicle, based on the image information received through the image sensor, and determining a default blind spot range of the adjacent vehicle; and providing, by a traveling road information generator, as traveling road information, information on a road on which the host vehicle is travelling, based on the image information. The determining of the dangerous level of the blind spot may include changing, by a blind spot range changing device, the default blind spot range, based on the traveling road information; and determining, by a blind spot dangerous level determining device, the dangerous level of the blind spot by matching a dangerous level of the adjacent vehicle, deduced by analyzing the accident history information of the adjacent vehicle and the driver tendency information of the driver of the adjacent vehicle, with the default blind spot range changed based on the traveling road information. The generating of the path in which the host vehicle deviates may include generating, by a path generator, a path for minimizing the dangerous level of the blind spot, based on the traveling situation of the host vehicle; and longitudinally or laterally controlling the host vehicle.

The determining of the dangerous level of the blind spot may include determining, by an object type determining device, a type of the adjacent vehicle, based on the image information; calculating, by an object size determining device, a size of the adjacent vehicle, based on the image information; storing, by a host vehicle information storage, data of the host vehicle, including a total height of the host vehicle and a roof area of the host vehicle; and determining, by a blind spot range determining device, the default blind spot range, based on any one or any combination of any two or more of the type of the adjacent vehicle, the size of the adjacent vehicle, the total height of the host vehicle, and the roof area of the host vehicle.

The determining of the dangerous level of the blind spot may include selecting one of blind spots stored depending on types of adjacent vehicles, based on the determined type of the adjacent vehicle; matching the selected blind spot with the detected adjacent vehicle; and determining a blind spot range matched with the adjacent vehicle, based on any one or any combination of any two or more of the determined size of the adjacent vehicle, the total height of the host vehicle, and the roof area of the host vehicle to determine the default blind spot range.

The determining of the dangerous level of the blind spot may include determining the dangerous level of the blind spot by matching the dangerous level of the adjacent vehicle, deduced by using the accident history information, including a number of times of accidents, an accident type, and an accident scale, of the adjacent vehicle, and the driver tendency information of the driver of the adjacent vehicle, received from an information providing server, with the default blind spot range changed based on a traveling path of the host vehicle and a traveling path of the adjacent vehicle.

The generating of the path in which the host vehicle deviates may include accelerating the host vehicle to deviate the host vehicle from the blind spot range of the adjacent vehicle, when the dangerous level of the blind spot and the dangerous level of the adjacent vehicle are higher than a specific reference, and when the host vehicle travels within the blind spot range of the adjacent vehicle.

The generating of the path in which the host vehicle deviates may include generating a path of passing through a safer blind spot by determining the dangerous level of the blind spot and the dangerous level of the adjacent vehicle, when the host vehicle avoids the blind spot of the adjacent vehicle by passing through the blind spot of the adjacent vehicle.

The adjacent vehicle may be larger than the host vehicle.

The adjacent vehicle may be a truck or a bus.

Other features and aspects will be apparent from the following detailed description, the drawings, and the claims.

BRIEF DESCRIPTION OF THE DRAWINGS

The above and other objects, features and advantages of the present disclosure will be more apparent from the following detailed description taken in conjunction with the accompanying drawings.

DETAILED DESCRIPTION

Figure 1:
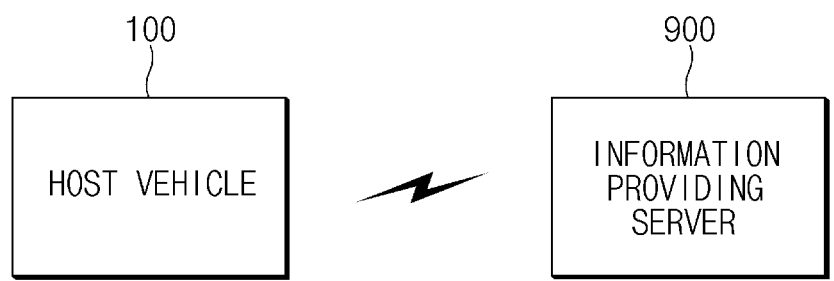
FIG. 1 is a block diagram illustrating a system for avoiding a blind spot of a vehicle using accident history information, according to an embodiment of the present disclosure.

Hereinafter, some embodiments of the present disclosure will be described in detail with reference to accompanying drawings. In adding the reference numerals to the components of each drawing, it should be noted that the identical or equivalent component is designated by the identical numeral even when they are displayed on other drawings. In addition, in the following description of an embodiment of the present disclosure, a detailed description of well-known features or functions will be ruled out in order not to unnecessarily obscure the gist of the present disclosure.

In describing the components of the embodiment according to the present disclosure, terms such as first, second, "A", "B", (a), (b), and the like may be used. These terms are merely intended to distinguish one component from another component, and the terms do not limit the nature, sequence or order of the constituent components. In addition, unless otherwise defined, all terms used herein, including technical or scientific terms, have the same meanings as those generally understood by those skilled in the art to which the present disclosure pertains. Such terms as those defined in a generally used dictionary are to be interpreted as having meanings equal to the contextual meanings in the relevant field of art, and are not to be interpreted as having ideal or excessively formal meanings unless clearly defined as having such in the present application.

An aspect of the present disclosure provides a system for avoiding a blind spot of a vehicle using accident history information, capable of inquiring a license plate of a large vehicle adjacently traveling to analyze an accident history (the number of times of accidents, the type of the accident, or the scale of the accident), of deducing the dangerous level of the large vehicle and the accident tendency of the driver based on the analyzing result such that the dangerous level of the large vehicle and the accident tendency of the driver are reflected in generating a path of deviating from a blind spot and a path of avoiding the blind spot, and of more actively addressing (generating a path and performing a control operation with respect to), especially, the blind spot, which is formed by the large vehicle having the higher probability (the higher dangerous level) for an accident, to reduce the accident probability, thereby ensuring the safe traveling of the host vehicle, and a method thereof.

The technical problems to be solved by the present disclosure are not limited to the aforementioned problems, and any other technical problems not mentioned herein will be clearly understood from the following description by those skilled in the art to which the present disclosure pertains.

As described above, according to the present disclosure, the license plate of the large vehicle adjacently traveling is inquired to analyze the accident history (the number of times of accidents, the type of the accident, or the scale of the accident), the dangerous level of the large vehicle and the accident tendency of the driver may be deduced based on the analysis result such that the dangerous level of the large vehicle and the accident tendency of the driver are reflected in generating a path of deviating from a blind spot and a path of avoiding the blind spot, and, especially, the blind spot, which is formed by the large vehicle having the higher probability (the higher dangerous level) for an accident may be more actively addressed (the path is generated and the control operation is performed) to reduce the accident probability, thereby ensuring the safe traveling of the host vehicle.

Hereinafter, embodiments of the present disclosure will be described with reference to FIGS. 1 to 10.

Figure 2:
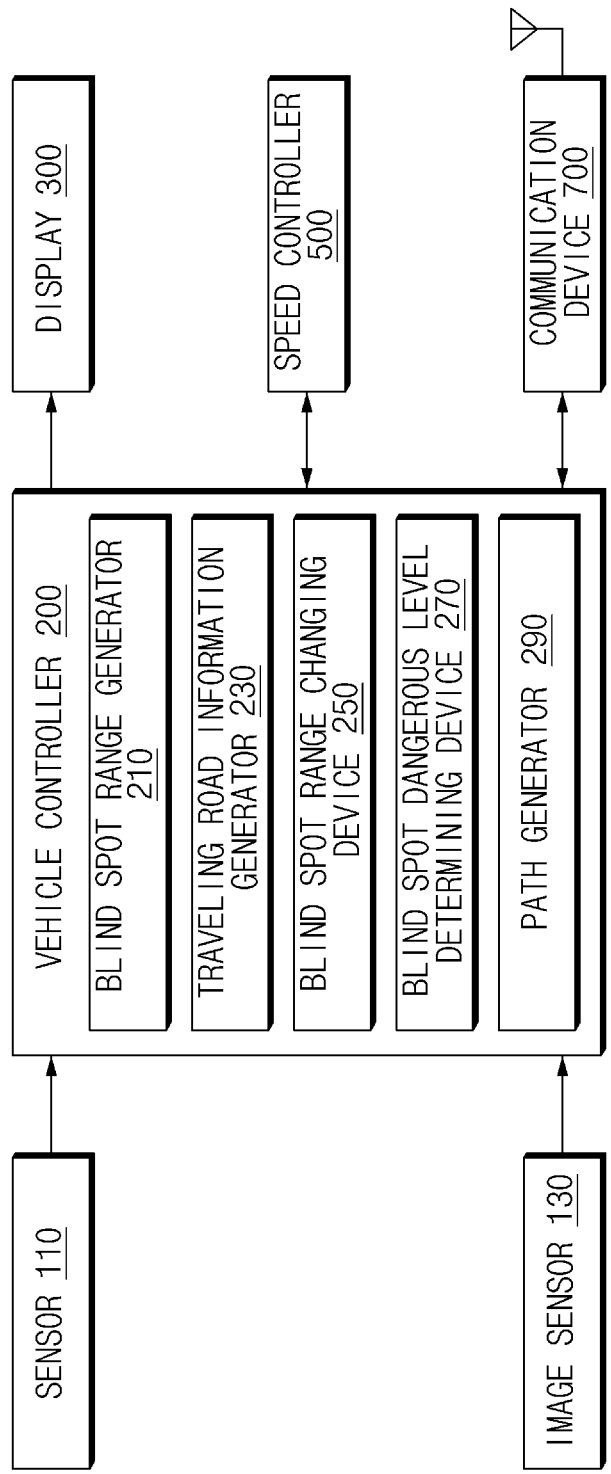
FIG. 2 is a block diagram illustrating a host vehicle constituting a system for avoiding a blind spot of a vehicle using accident history information, according to an embodiment of the present disclosure.
Figure 3:
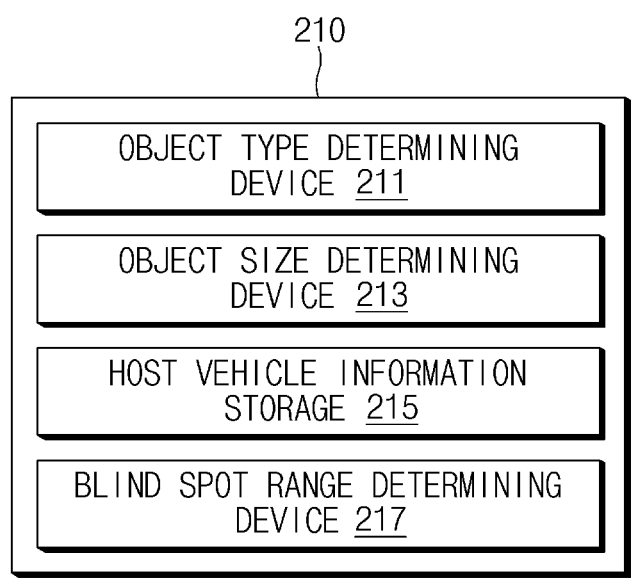
FIG. 3 is a block diagram illustrating a blind spot range generator in a host vehicle, according to an embodiment of the present disclosure.
Figure 4:
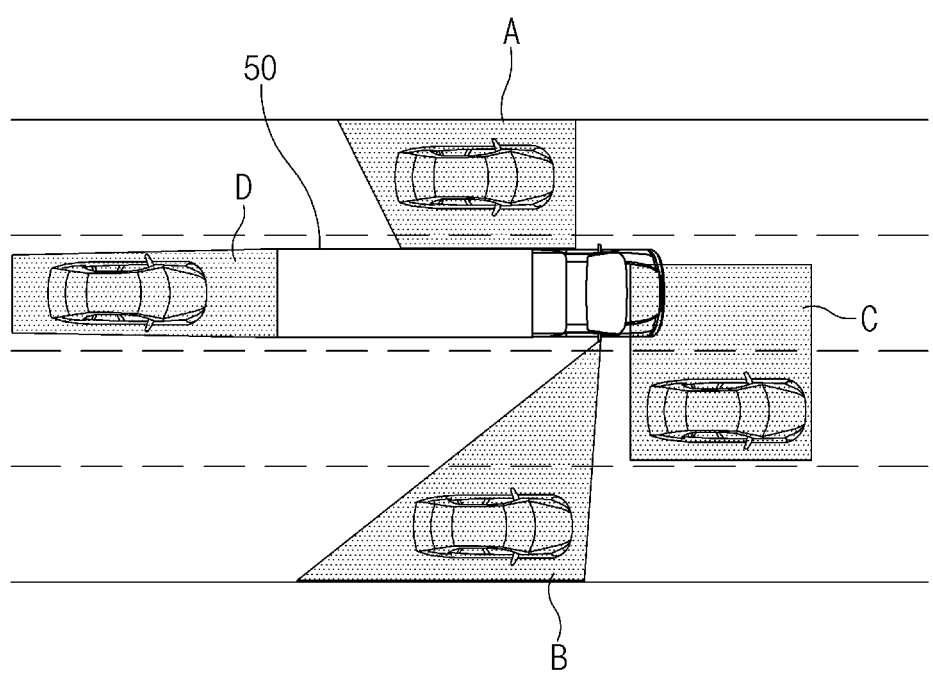
FIG. 4 is a view illustrating a blind spot of a large vehicle applied to a system for avoiding a blind spot of a vehicle using accident history information, according to an embodiment of the present disclosure.
Figure 9:
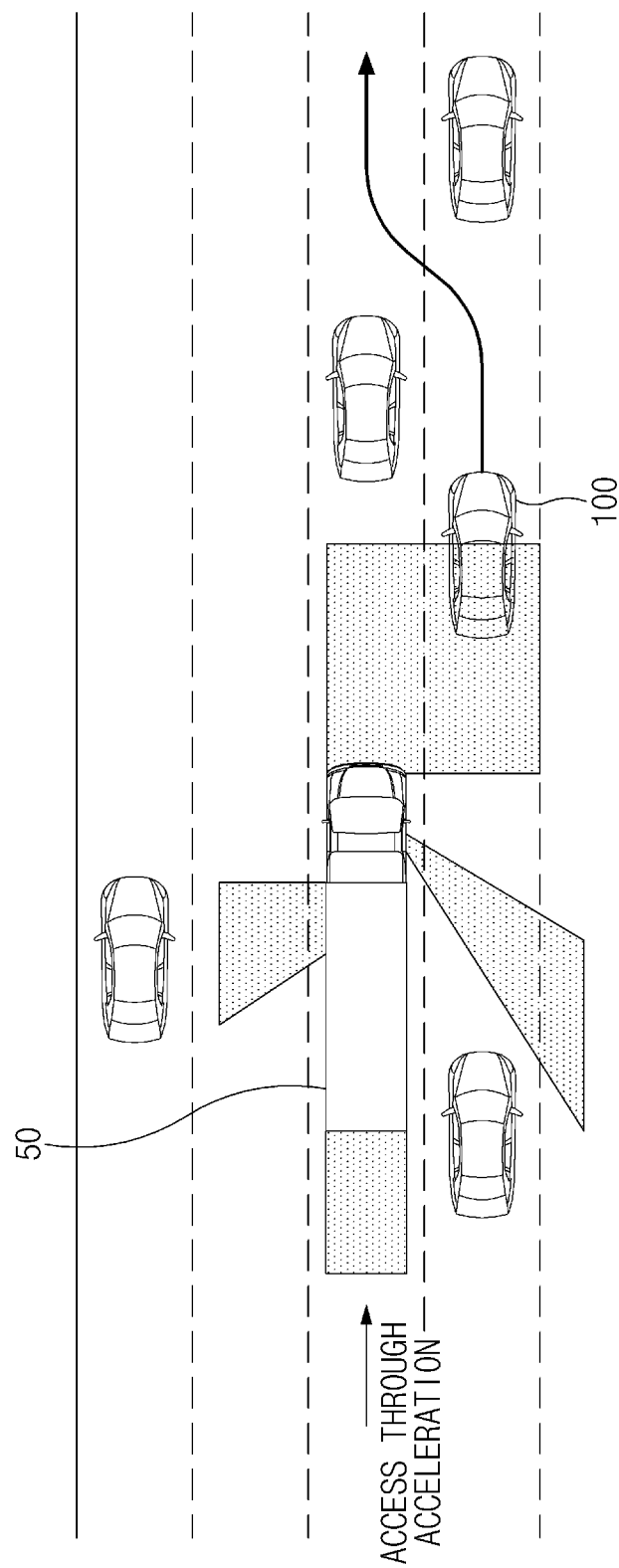
FIGS. 9 and 10 are views illustrating generation of a path through a system for avoiding a blind spot of a vehicle using accident history information, according to an embodiment of the present disclosure.
Figure 10:
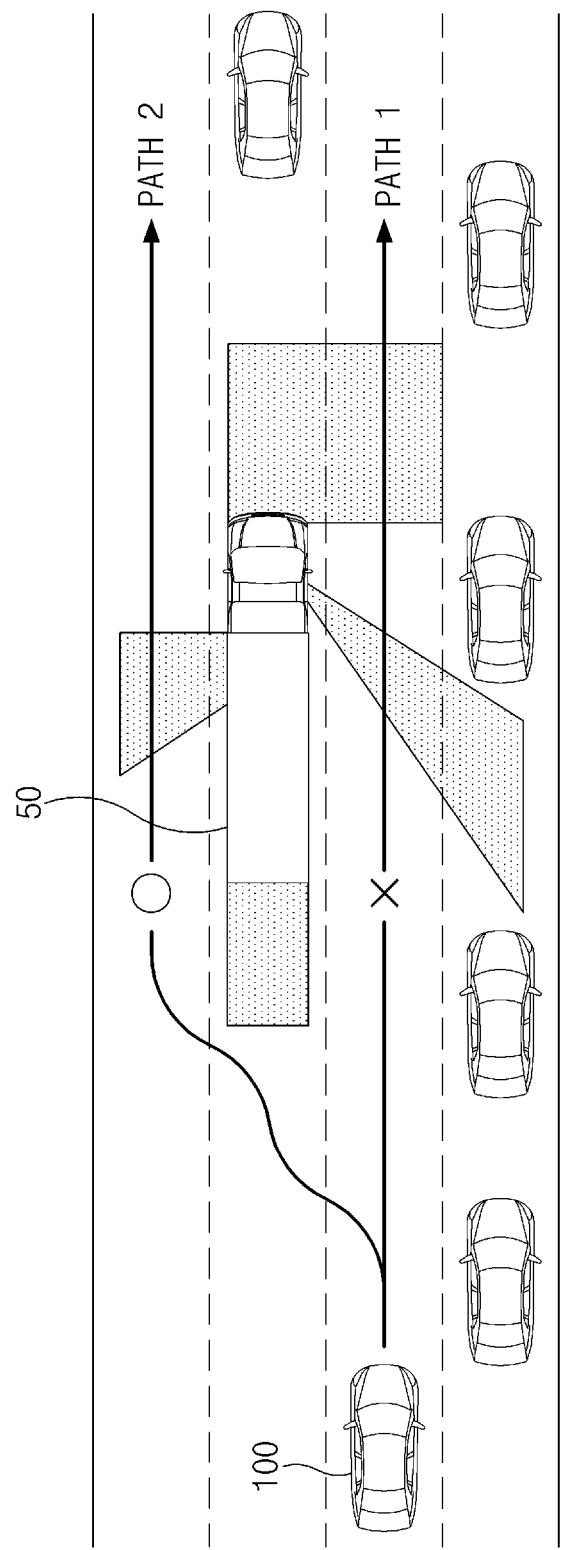

FIG. 1 is a block diagram illustrating a system for avoiding a blind spot of a vehicle using accident history information, according to an embodiment of the present disclosure, and FIG. 2 is a block diagram illustrating a host vehicle constituting a system for avoiding a blind spot of a vehicle using accident history information, according to an embodiment of the present disclosure. FIG. 3 is a block diagram illustrating a blind spot range generator in a host vehicle, according to an embodiment of the present disclosure, and FIG. 4 is a view illustrating a blind spot of a large vehicle applied to a system for avoiding a blind spot of a vehicle using accident history information, according to an embodiment of the present disclosure. FIGS. 5 to 8 are views illustrating detection of a blind spot of a large vehicle through a system for avoiding a blind spot of a vehicle using accident history information, according to an embodiment of the present disclosure, and FIGS. 9 and 10 are views illustrating generation of a path through a system for avoiding a blind spot of a vehicle using accident history information, according to an embodiment of the present disclosure.

Referring to FIGS. 1 and 2, according to an embodiment of the present disclosure, a system for avoiding the blind spot of the vehicle using accident history information may include a host vehicle 100 including a sensor 110, an image sensor 130, a vehicle controller 200, a display 300, a speed controller 500, and a communication device 700.

The sensor 110 may include a radar, a Light Detection and Ranging (LiDAR), and an ultrasonic sensor mounted on a side surface of the host vehicle 100, may sense a next-lane vehicle traveling on a lane next to a lane of the host vehicle 100, and may provide information on the next-lane vehicle to the vehicle controller 200.

The image sensor 130 may include at least one of a front camera to acquire a front image of the host vehicle 100, a rear camera to acquire a rear image of the host vehicle 100, a left camera to acquire a left image of the host vehicle 100, or a right camera to acquire a right image of the host vehicle 100. The image sensor 130 may acquire a surrounding image of the host vehicle 100, may generate image information, and may provide the generated image information to the vehicle controller 200.

For example, the image sensor 130 may acquire the front image, the rear image, the left image, and the right image of the host vehicle 100, and may provide the acquired image, which serves as the image information, to a blind spot range generator 210 and a traveling road information generator 230 of the vehicle controller 200.

The image sensor 130 may sense a license plate of a large vehicle 50, which is positioned around the host vehicle 100, and may provide information on the license plate to the vehicle controller 200.

The vehicle controller 200 may receive information (accident history information) on an accident history of the large vehicle 50 and information on the tendency of a driver, which are obtained from the inquiry of the license plate, from an information providing server 900, after transmitting the information on the license plate, which is sensed through the image sensor 130, of the large vehicle 50 to the information providing server 900 and may reflect the information in determining a dangerous level of a blind spot. The vehicle controller 200 may include the blind spot range generator 210, the traveling road information generator 230, a blind spot range changing device 250, a blind spot dangerous level determining device 270, and a path generator 290.

The blind spot range generator 210 may receive, as the image information, the sensing result of the sensor 110 and a surrounding image, which is acquired from the image sensor 130, of the host vehicle 100. The blind spot range generator 210 may determine a default blind spot range of the large vehicle 50 traveling around the host vehicle 100, based on the image information.

In this case, the blind spot range generator 210 may provide, as default blind spot range information, the determined default blind spot range of the large vehicle 50 to the blind spot range changing device 250.

For example, the blind spot range generator 210 may sense the large vehicle 50 positioned around the host vehicle 100, based on the image information, may determine the type and the size of the large vehicle 50, may determine the default blind spot range of the large vehicle 50 traveling around the host vehicle 100, based on the type and the size of the large vehicle 50 and the information of the host vehicle 100, and may provide, as the default blind spot range information, the default blind spot range of the large vehicle 50 to the blind spot range changing device 250.

In addition, referring to FIG. 3, the blind spot range generator 210 may include an object type determining device 211, an object size determining device 213, a host vehicle information storage 215, and a blind spot range determining device 217.

The object type determining device 211 may determine the type of a vehicle traveling adjacent to the host vehicle 100, based on the image information, and may provide, as determined object type information, the determined information to the object size determining device 213 and the blind spot range determining device 217.

For example, when the vehicle traveling adjacent to the host vehicle 100 is determined as being the large vehicle 50, based on the image information, the object type determining device 211 may insert the information on that the vehicle traveling adjacent to the host vehicle 100 is the large vehicle 50, and information on the type of the large vehicle 50 into determined object type information, and may provide the inserting result to the object size determining device 213 and the blind spot range determining device 217.

In this case, the type of the large vehicle 50 may include a truck or a bus.

The object size determining device 213 may calculate the size of the large vehicle 50, based on the image information, and provide, as object size information, the calculated information to the blind spot range determining device 217, when the information on that the vehicle traveling adjacent to the host vehicle 100 is the large vehicle 50 is inserted into the determined object type information provided from the object type determining device 211.

For example, the object size determining device 213 may calculate the total height and the width of the large vehicle 50, based on the image information, and provide, as the object size information, the calculated information to the blind spot range determining device 217, when receiving the information on that the vehicle traveling adjacent to the host vehicle 100 is the large vehicle 50 and the information on the type of the large vehicle 50.

The host vehicle information storage 215 may store information (such as the total height and the width of the host vehicle 100, and an area of a main portion (for example, a roof area of the vehicle or an area between an A pillar and a C pillar) forming the total height of the host vehicle 100) of the host vehicle 100, and may provide, as information (host vehicle information) on the host vehicle 100, the stored information to the blind spot range determining device 217.

The blind spot range determining device 217 may receive the determined object type information from the object type determining device 211, receive the object size information from the object size determining device 213, and receive the information on the host vehicle from the host vehicle information storage 215.

The blind spot range determining device 217 may generate the default blind spot range information, based on at least one of the determined object type information, the object size information, and the host vehicle information.

For example, the blind spot range determining device 217 may determine the default blind spot range of the large vehicle 50 traveling adjacent to the host vehicle 100, based on the type of the large vehicle 50, which is included in the determined object type information, the size of the large vehicle 50, which is included in the object size information, and the total height of the host vehicle 100 and the roof area of the host vehicle 100 which are included in the information on the host vehicle 100, and may output, as the default blind spot range information, the determined default blind spot range.

In other words, the blind spot range determining device 217 may select one of blind spots stored depending on types of large vehicles 50, based on the determined type of the large vehicle 50, may match the selected blind spot with the sensed large vehicle 50, and may determine the blind spot range matched with the large vehicle 50, based on the determined size of the large vehicle 50 and the total height and the roof area of the host vehicle 100, thereby determining the default blind spot range.

The traveling road information generator 230 may receive, as the image information, the surrounding image, which is acquired from the image sensor 130, of the host vehicle 100, may generate information on a road (traveling road of the host vehicle 100) on which the host vehicle 100 travels, based on the image information, and may provide, as traveling road information, the generated road information to the blind spot range changing device 250 and the blind spot dangerous level determining device 270.

For example, the traveling road information generator 230 may determine a curvature, a lateral gradient, a longitudinal gradient, and a merging point of the travelling road of the host vehicle 100, based on the image information, and may provide, as the traveling road information, the determined information to the blind spot range changing device 250 and the blind spot dangerous level determining device 270.

The blind spot range changing device 250 may receive the default blind spot range information provided from the blind spot range generator 210 and the traveling road information provided from the traveling road information generator 230.

The blind spot range changing device 250 may generate changed blind spot range information by changing the default blind spot range information, which is generated based on the image information, based on the traveling road information, and may provide the generated and changed blind spot range information to the blind spot dangerous level determining device 270.

For example, the blind spot range changing device 250 may expand or reduce the blind spot range of the large vehicle 50, which is included in the default blind spot range information, based on at least one of information on a curvature, information on a lateral gradient, or information on a longitudinal gradient of the traveling road, which is included in the traveling road information, and may output the expanded or reduced result serving as the changed blind spot range information.

The blind spot dangerous level determining device 270 may match the dangerous level of the large vehicle 50, which is deduced by analyzing the accident history information of the large vehicle 50 and the driving tendency information of the driver of the large vehicle 50, which are obtained from the inquiry of the license plate of the large vehicle 50, with the changed default blind spot range based on the traveling road information, and may output, as blind spot information, the information on the changed default blind spot range matched with the dangerous level of the large vehicle 50.

For example, the blind spot dangerous level determining device 270 may determine a dangerous ranking for blind spots of the large vehicle 50 by matching the dangerous level of the large vehicle 50, which is obtained based on the accident history information, which includes the number of times of accidents, an accident type, and an accident scale received from the information providing server 900, of the large vehicle 50 and on the driving tendency information of the driver of the large vehicle 50, with the default blind spot range changed depending on the traveling path of the host vehicle 100 and the traveling path of the large vehicle 50.

Thereafter, the blind spot dangerous level determining device 270 may output, as blind spot information, blind spot varying range information having the determined dangerous ranking.

In other words, the blind spot dangerous level determining device 270 may determine the dangerous level of the large vehicle 50 as being higher, as the number of times of accidents of the large vehicle 50, which is received from the information providing server 900, is increased. In addition, when the driver of the large vehicle 50 is determined as corresponding to a driver careless a front-right portion or at a front portion by using the driver tendency information of the driver of the large vehicle 50, which is obtained from the information providing server 900, the blind spot dangerous level determining device 270 may determine the blind spot positioned at the front-right portion or the front portion of the large vehicle 50 as a place having a higher dangerous level.

The path generator 290 may generate a path to minimize the dangerous level, based on the traveling situation of the host vehicle 100, and may longitudinally or laterally control for the host vehicle 100 such that the host vehicle 100 may travel while deviating from or avoiding the blind spot.

The display 300 may include a sound device or a display device. The display 300 may link to a navigation device (not illustrated) to map a path (avoiding path) for avoiding the blind spot and a path (deviating path) for deviating from the blind spot to map data and may display the map data on a screen.

The speed controller 500 may control the host vehicle 100 to decelerate or accelerate on the traveling path, when the host vehicle 100 fails to generate the path for deviating from the blind spot or the path for avoiding the blind spot to travel.

The communication device 700, which wirelessly makes communication with the information providing server 900, may transmit, to the information providing server 900, the information on the license plate of the large vehicle 50, which is photographed through the image sensor 130 of the host vehicle 100, and may receive, from the information providing server 900, the number of times of accidents, the accident type, or the accident scale of the large vehicle 50, and the driving tendency information of the driver of the large vehicle 50, which are to be transmitted to the vehicle controller 200.

Hereinafter, an operation for the blind spot range determining device 217 to generate the default blind spot range information, based on the determined object type information, object size information, and host vehicle information will be described with reference to FIGS. 4 to 6.

The blind spot range determining device 217 may have various types of blind spot information depending on the types of the blind spot 50.

The blind spot range determining device 217 may select one of blind spot information stored depending on the types of the large vehicle 50, based on the determined object type information, and may match the selected blind spot information with the sensed large vehicle 50.

Referring to FIG. 4, when the large vehicle 50 is a truck, the blind spot of the large vehicle 50 may include a left blind spot "A" of the large vehicle 50, a right blind spot "B" of the large vehicle 50, a front-right blind spot "C" of the large vehicle 50, and a rear blind spot "D" of the large vehicle 50.

In this case, the blind spot of the large vehicle 50, which is illustrated in FIG. 4, is shown on the assumption that the driver seat of the large vehicle 50 is positioned at the left side. Accordingly, when the driver seat of the large vehicle 50 is positioned at the right side, the form of the blind spot of the large vehicle 50 may be changed.

The blind spot range determining device 217 may expand or reduce the range (e.g., size) of the blind spot matched with the large vehicle 50, based on information on the host vehicle 100.

For example, the blind spot range determining device 217 may expand or reduce the blind spot range matched with the large vehicle 50, based on at least one of the total height of the host vehicle 100 or the roof area of the host vehicle 100, which are included in the information on the host vehicle 100.

In more detail, the blind spot range determining device 217 may expand the blind spot range matched with the large vehicle 50, as the total height of the host vehicle 100, which is included in the information on the host vehicle 100, is reduced.

Meanwhile, the blind spot range determining device 217 may reduce the blind spot range matched with the large vehicle 50, as the total height of the host vehicle 100, which is included in the information on the host vehicle 100, is increased.

Figure 5:
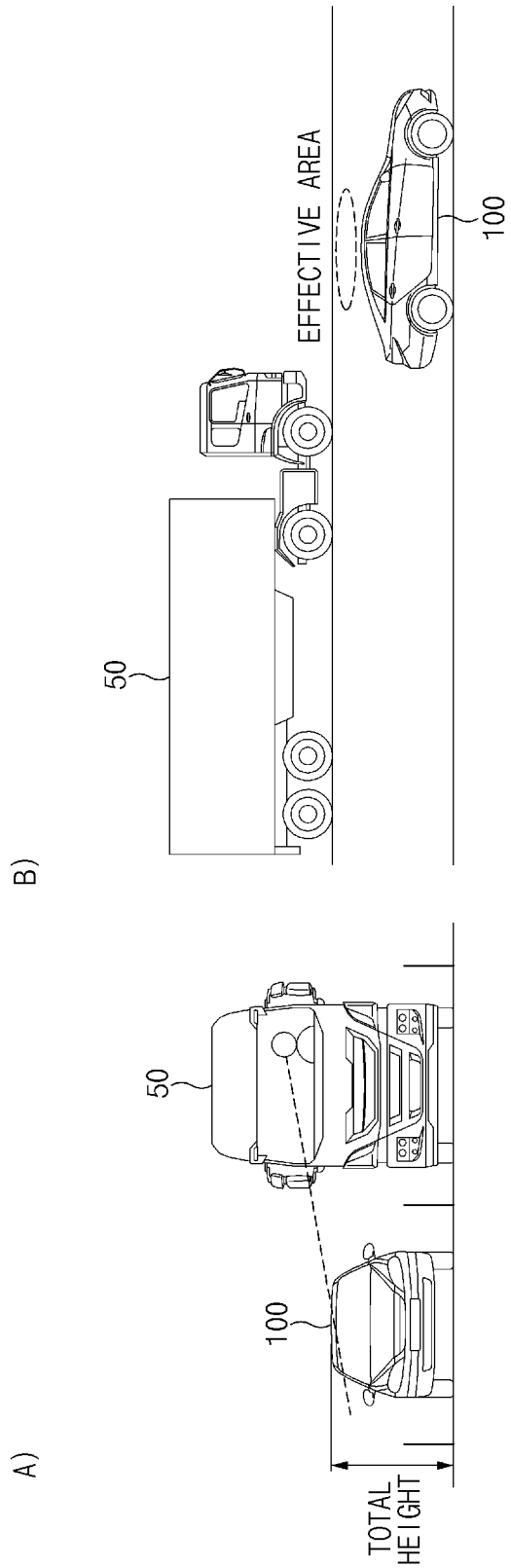
FIGS. 5 to 8 are views illustrating detection of a blind spot of a large vehicle through a system for avoiding a blind spot of a vehicle using accident history information, according to an embodiment of the present disclosure.

The blind spot range determining device 217 should be configured to expand or reduce the blind spot range matched with the large vehicle 50, based on the total height of the host vehicle 100, because the driver of the large vehicle 50 fails to sufficiently recognize the host vehicle 100, as the total height of the host vehicle 100 becomes lower, while being able to sufficiently recognize the host vehicle 100, as the total height of the host vehicle 100 becomes higher as illustrated in reference numeral "A)" of FIG. 5.

Meanwhile, the blind spot range determining device 217 may reduce the blind spot range matched with the large vehicle 50, as the roof area of the host vehicle 100, which is included in the information on the host vehicle 100, is increased.

Meanwhile, the blind spot range determining device 217 may expand the blind spot range matched with the large vehicle 50, as the roof area of the host vehicle 100, which is included in the information on the host vehicle 100, is reduced.

The blind spot range determining device 217 should be configured to expand or reduce the blind spot range matched with the large vehicle 50, based on the roof area of the host vehicle 100, because the driver of the large vehicle 50 fails to sufficiently recognize the host vehicle 100, as the roof area of the host vehicle 100 becomes narrower, while being able to sufficiently recognize the host vehicle 100, as the roof area of the host vehicle 100 becomes wider as illustrated in reference numeral "B)" of FIG. 5.

In other words, when the roof area of the host vehicle 100 is wider, the driver of the large vehicle 50 may more easily recognize the host vehicle 100, as compared to when the roof area of the host vehicle 100 is narrower. Accordingly, the matched blind spot of the large vehicle 50 may be expanded or reduced based on the roof area of the host vehicle 100, thereby ensuring the safety of the host vehicle 100.

In addition, the blind spot range determining device 217 may expand or reduce the blind spot range matched with the large vehicle 50, based on the total height of the large vehicle 50, which is included in the information on the object size.

Figure 6:
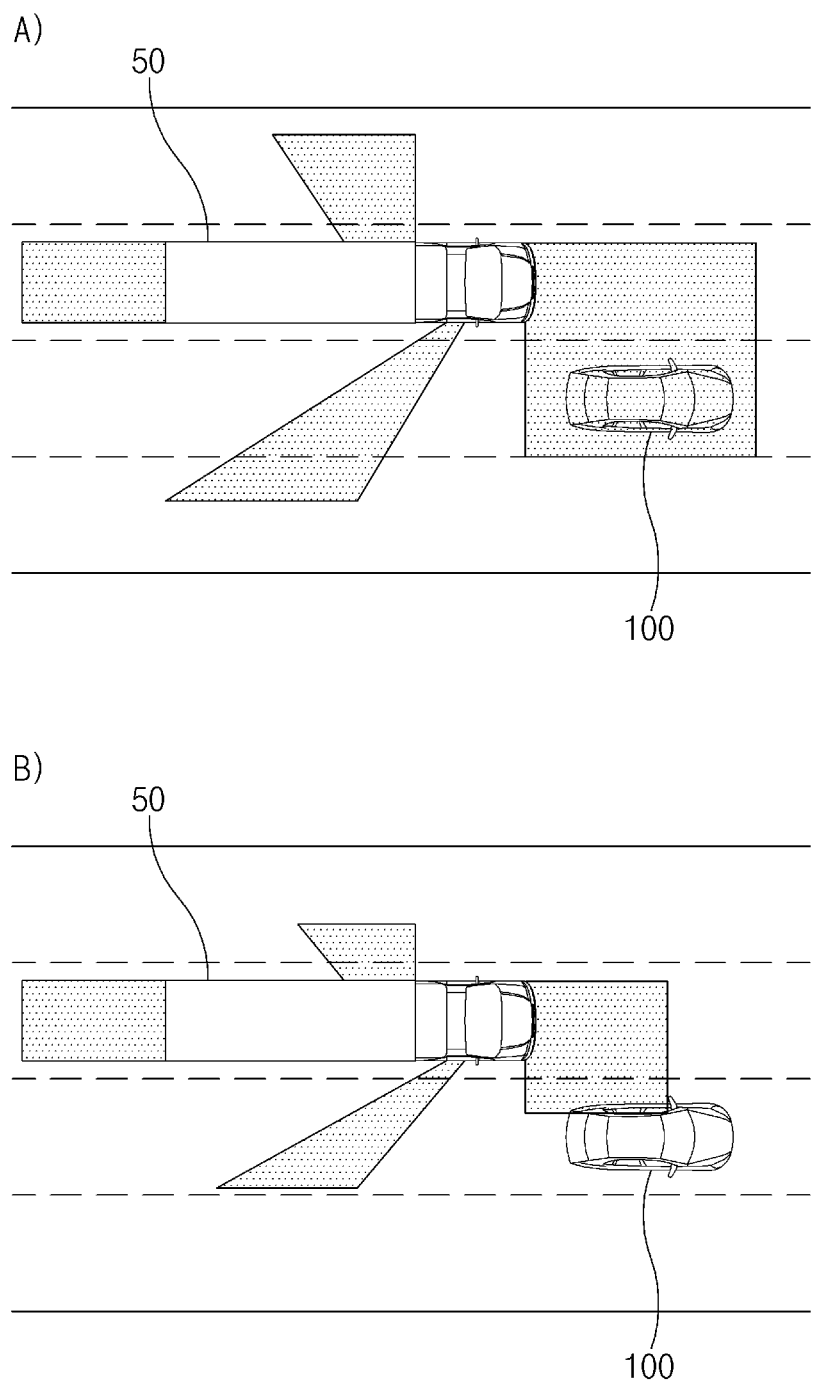

For example, as illustrated in reference numeral "A)" of FIG. 6, the blind spot range determining device 217 may expand the blind spot range matched with the large vehicle 50, as the total height of the large vehicle 50, which is included in the object size information, becomes higher.

For example, as illustrated in reference numeral "B)" of FIG. 6, the blind spot range determining device 217 may reduce the blind spot range matched with the large vehicle 50, as the total height of the large vehicle 50, which is included in the object size information, becomes lower.

The blind spot range determining device 217 should be configured to expand or reduce the blind spot range matched with the large vehicle 50, based on the total height of the large vehicle 50, because the driver of the large vehicle 50 having the higher total height fails to sufficiently recognize the host vehicle 100 traveling adjacent to the large vehicle 50 while the driver of the large vehicle 50 having the lower total height sufficiently recognizes the host vehicle 100 traveling adjacent to the large vehicle 50.

In other words, the driver of the large vehicle 50 having the lower total height may more easily recognize the host vehicle 100 traveling adjacent to the large vehicle 50, as compared with the driver of the large vehicle 50 having the higher total height. Accordingly, the safety of the host vehicle 100 may be ensured by expanding or reducing the blind spot of the large vehicle 50 depending on the sensed total height of the large vehicle 50.

As described above, the blind spot range changing device 250 of FIG. 2 may change the default blind spot range information of the large vehicle 50, which is generated from the blind spot range generator 210, based on the traveling road information, and may output, as the changed blind spot range information of the large vehicle 50, the default blind spot range information of the large vehicle 50, which is changed.

For example, the blind spot range changing device 250 may change the default blind spot range information of the large vehicle 50, based on the information on the curvature, the information on the lateral gradient, and the information on the longitudinal gradient included in the traveling road information of the host vehicle 100, and may output, as the changed blind spot range information of the large vehicle 50, the default blind spot range information of the large vehicle 50, which is changed.

Figure 7:
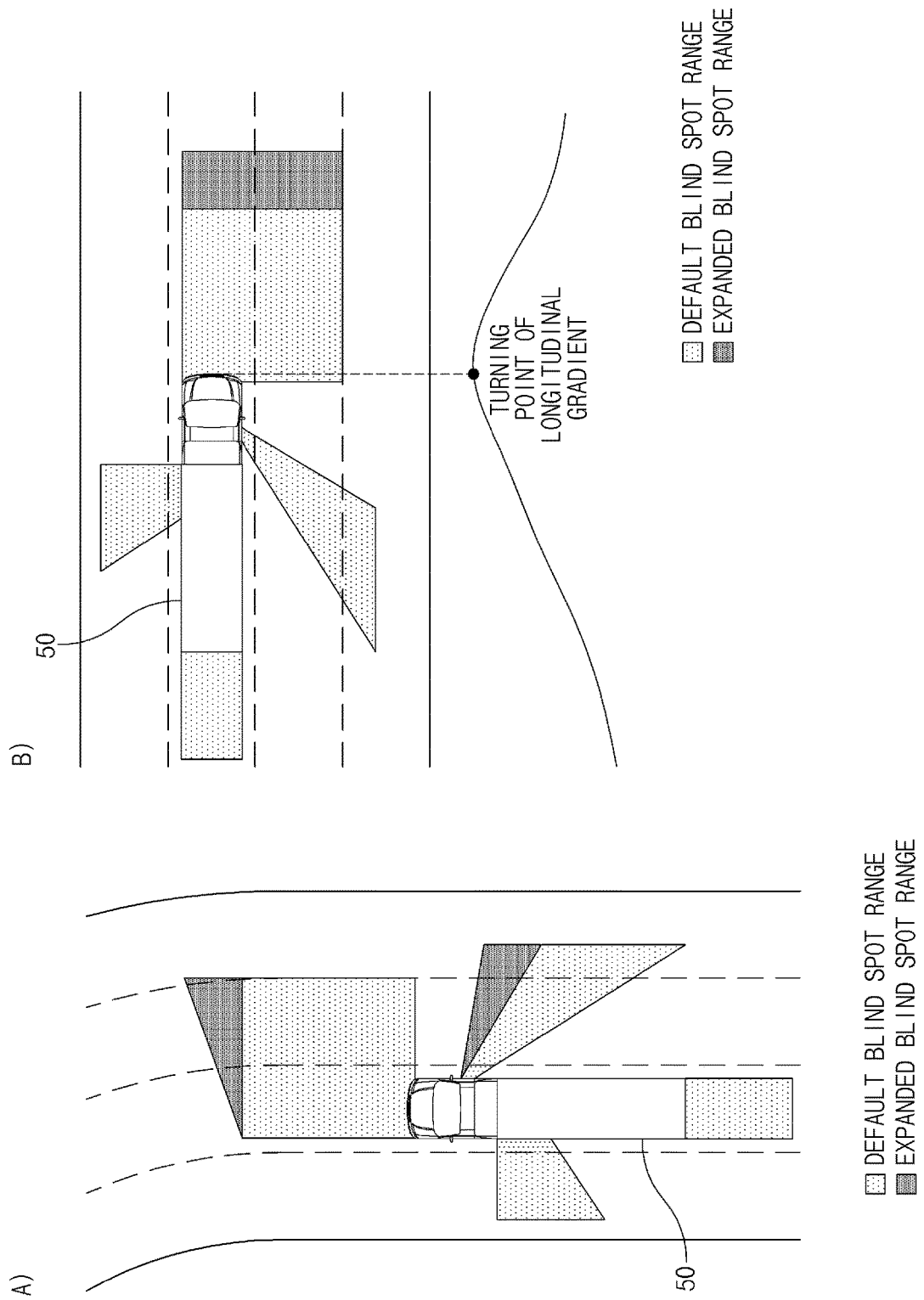

As illustrated in reference numeral "A)" of FIG. 7, the blind spot range changing device 250 may expand a right blind spot range of the large vehicle 50 on a left turn road, based on the curvature of the traveling road of the host vehicle 100, which is included in the traveling road information, and may insert information on the expanded right blind spot of the large vehicle 50 into the changed blind spot range. In this case, the blind spot range changing device 250 may expand the right blind spot range of the large vehicle 50, as the curvature of the left turn road is increased.

Although not illustrated, the blind spot range changing device 250 may expand a left blind spot range of the large vehicle 50 on a right turn road, based on the curvature of the traveling road of the host vehicle 100, which is included in the traveling road information.

In this case, the blind spot range changing device 250 may expand the left blind spot range of the large vehicle 50, as the curvature of the right turn road is increased.

As described above, the blind spot range changing device 250 may expand or reduce the default blind spot range, which is included in the default blind spot range information of the large vehicle 50, based on the curvature of the road, and may output information on the expanded or reduced range as the changed blind spot range information of the large vehicle 50.

In addition, the blind spot range changing device 250 may change the default blind spot range information of the large vehicle 50, based on the information on the longitudinal gradient of the travelling road included in the traveling road information, and may output, as the changed blind spot range information of the large vehicle 50, the default blind spot range information of the large vehicle 50 which is changed.

For example, as illustrated in reference numeral "B)" of FIG. 7, the blind spot range changing device 250 may expand a front-right blind spot of the large vehicle 50, when the large vehicle 50 reaches a turning point of the longitudinal gradient included in the traveling road information. In this case, although reference numeral "B)" of FIG. 7 illustrates that the front-right blind spot of the large vehicle 50 is expanded at the turning point of the longitudinal gradient, at which an uphill is switched to a downhill, the front-right blind spot of the large vehicle 50 may be reduced at a point at which the downhill is switched to the uphill.

Although illustrated in FIG. 7, the blind spot range changing device 250 may expand and reduce the front-right blind spot of the large vehicle 50 at a turning point of the lateral gradient, based on information on the lateral gradient of the travelling road, which is included in the traveling road information.

As described above, the blind spot range changing device 250 may expand or reduce the default blind spot range, which is included in the default blind spot range information of the large vehicle 50, at the turning point of the longitudinal gradient or the lateral gradient, and may output information on the expanded or reduced range as the changed blind spot range information of the large vehicle 50.

The blind spot dangerous level determining device 270 of FIG. 2 may match the dangerous level with the blind spot of the large vehicle 50, which is included in the changed blind spot range information, based on the traveling road information, and may output the changed blind spot range information of the large vehicle 50, which is matched with the dangerous level, as blind spot information.

For example, when a merging point, at which the traveling road of the host vehicle 100 is merged with another road, is included in the traveling road information, the blind spot dangerous level determining device 270 may determine the dangerous ranking with respect to the blind spot of the large vehicle 50, based on the traveling path of the large vehicle 50 and the traveling path of the host vehicle 100, and may output the change blind spot range information having the determined dangerous ranking, as the blind spot information.

Figure 8:
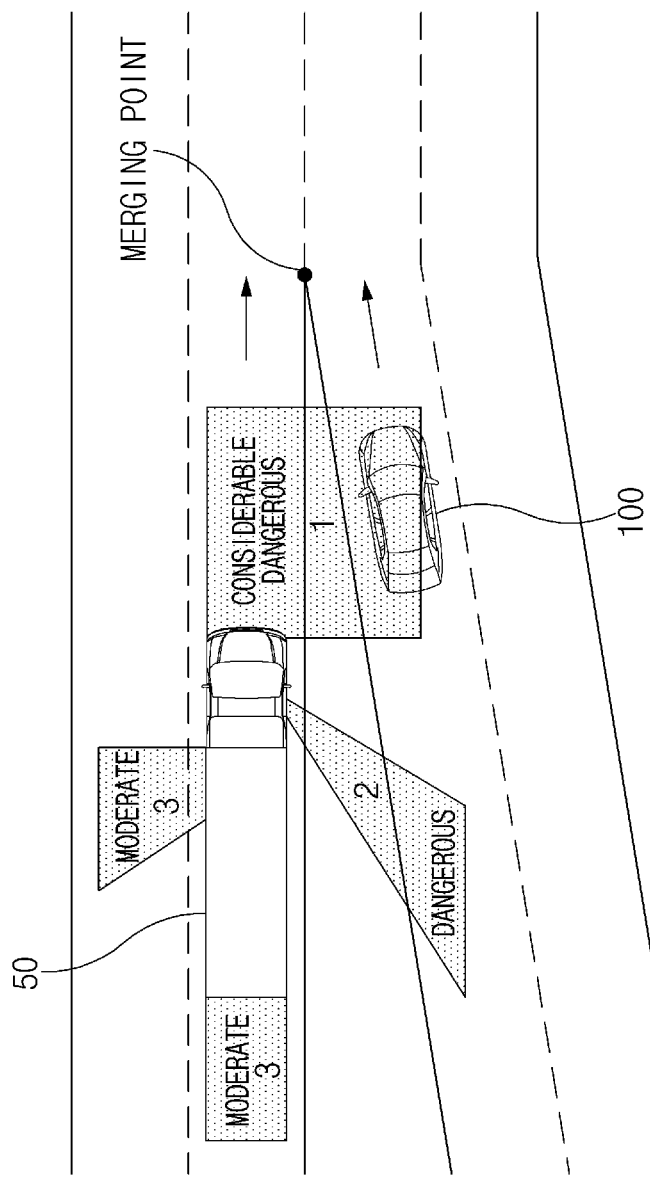

For example, as illustrated in FIG. 8, when viewed from the merging point included in the traveling road information and when the host vehicle 100 is traveling at the right side of the large vehicle 50, the blind spot dangerous level determining device 270 may match a dangerous level, which is higher than that of the left blind spot, to the right blind spot of the large vehicle 50 and the changed blind spot range information of the large vehicle 50 having the matched dangerous level may be output as the blind spot information.

Meanwhile, although not disclosed in drawings, when viewed from the merging point included in the traveling road information and when the host vehicle 100 is traveling at the left side of the large vehicle 50, the blind spot dangerous level determining device 270 may match a dangerous level, which is higher than that of the right blind spot, to the left blind spot of the large vehicle 100 and the change blind spot range information of the large vehicle 50 having the matched dangerous level may be output as the blind spot information.

In addition, the blind spot dangerous level determining device 270 may generate blind spot information by matching the highest dangerous level to a blind spot of the large vehicle 50, in which the host vehicle 100 is to be merged at the merging point, based on the traveling path of the host vehicle 100 and the traveling path of the large vehicle 50.

The vehicle controller 200 may accelerate the host vehicle 100 such that the host vehicle 100 deviates from the blind spot, when the host vehicle 100 is determined as being traveling within the blind spot range of the large vehicle 50 based on the blind spot information of the large vehicle 50 and when the dangerous level of the blind spot and the dangerous level of the large vehicle 50 are higher than a specific reference.

For example, the vehicle controller 200 may control the host vehicle 100 to instantly accelerate and to deviate from the blind spot to minimize a time for traveling of the host vehicle 100 in a blind spot, when the host vehicle 100 is determined as being traveling in the blind spot of the large vehicle 50, and when the number of times of accidents of the large vehicle 50 is five times, and the driving tendency of the driver of the large vehicle 50 is determined as being careless at the right portion and the front-right portion, so the dangerous level of the relevant blind spot and the dangerous level of the large vehicle 50 are higher.

In addition, when the host vehicle 100 generates the path (avoiding path) for avoiding the blind spot, the host vehicle 100 may pass through the blind spot of the large vehicle 50. Even in this case, the vehicle controller 200 may determine the dangerous level of the blind spot and the dangerous level of the large vehicle 50 to select a path of passing through a safer blind spot for travelling.

For example, the vehicle controller 200 may determine the dangerous level of the blind spot and the dangerous level of the 29 large vehicle 50, and may control the host vehicle 100 to select a path of passing through a left blind spot, which is safer, of the large vehicle 50 for traveling, when the host vehicle 100 generates the avoiding path, when the host vehicle 100 passes through a blind 5 spot of the large vehicle 50, when the number of times of accidents of the large vehicle 50 is five times, and when the driving tendency of the driver of the large vehicle 50 is determined as being careless at the right portion and the front-right portion. As illustrated in FIG. 10, the safer path passing through the left blind spot is illustrated as Path 1 while the less safe path passing through the right side blind spot is illustrated as path 2.

Figure 11:
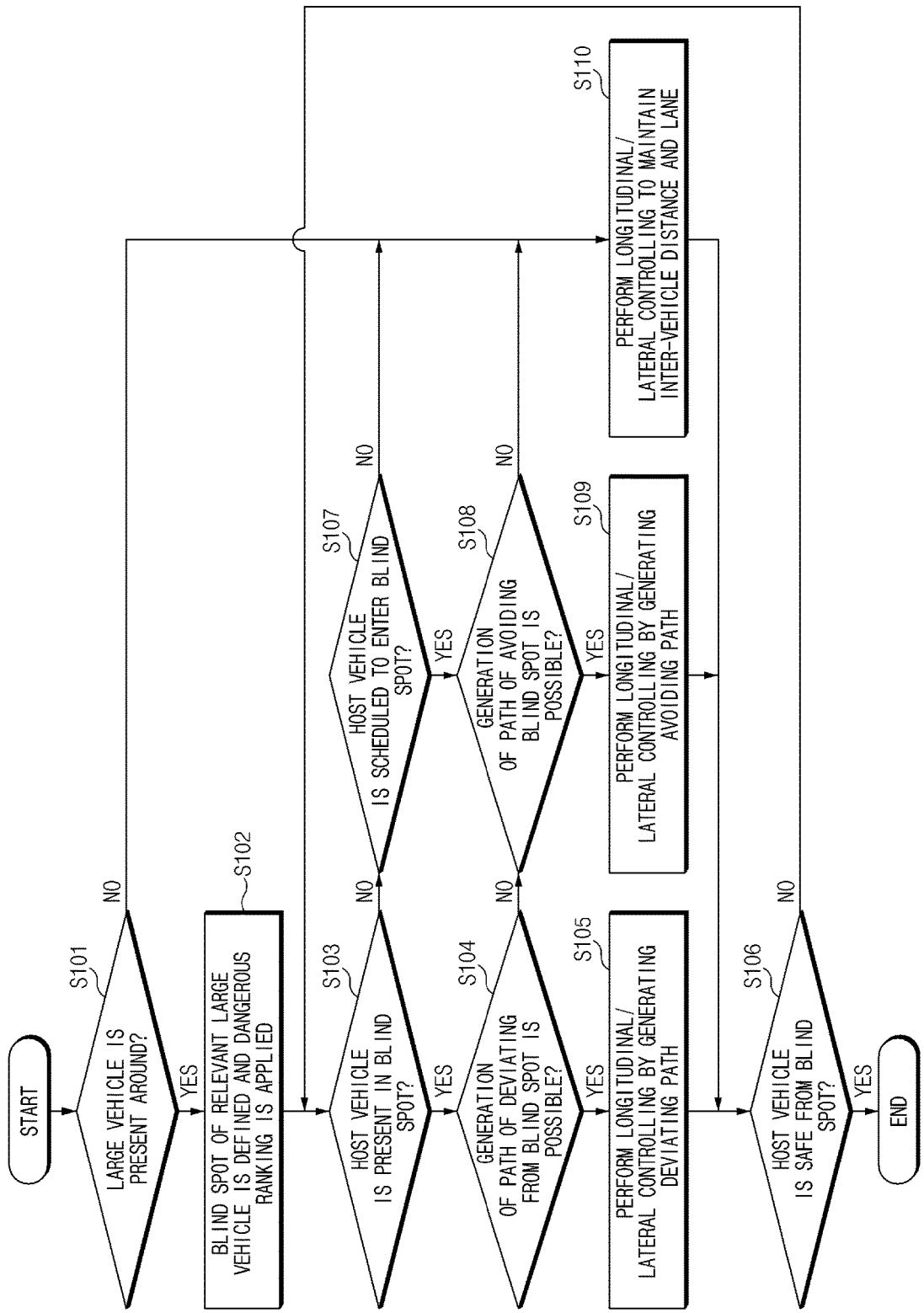
FIGS. 11 and 12 are flowcharts illustrating a method for avoiding a blind spot of a vehicle using accident history information, according to an embodiment of the present disclosure.
Figure 12:
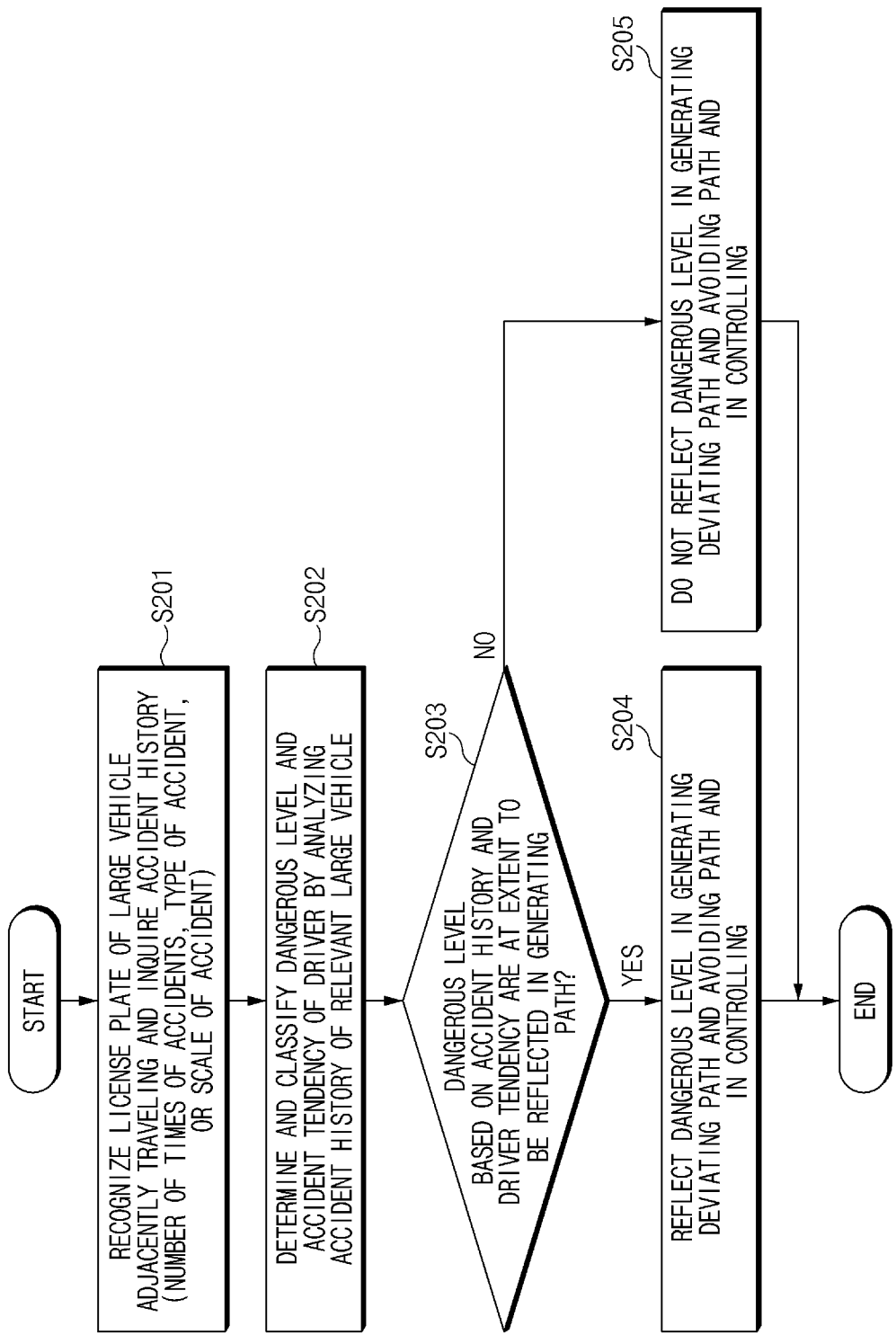

Hereinafter, a method for avoiding a blind spot of a vehicle using accident history information, according to another embodiment of the present disclosure will be described with reference to FIGS. 11 and 12. FIGS. 11 and 12 are flowcharts illustrating the method for avoiding the blind spot of the vehicle using the accident history information, according to an embodiment of the present disclosure.

The following description will be made on the assumption that the system for avoiding the blind spot of the vehicle using the accident history information as illustrated in FIGS. 1 and 2 performs processes of FIGS. 11 and 12.

First, the large vehicle 50 traveling adjacent to the host vehicle 100 may be sensed through the image sensor 130 (S101), and the dangerous level may be determined after determining the blind spot range of the large vehicle 50 (S102). In another instance, the host vehicle 100 may sense there is no blind spot present through the image sensor 130 and the vehicle 100 is safe (S106).

Regarding the dangerous level of the blind spot, the information on the license plate, which is sensed through the image sensor 130, of the large vehicle 50 is transmitted to the information providing server 900 (S201), and the dangerous level of the blind spot may be determined based on the accident history information of the large vehicle 50 and the driving tendency information of the driver of the large vehicle 50 (S202).

Thereafter, the vehicle controller 200 may determine whether the dangerous level of the blind spot is higher than specific reference to be reflected in generating a path, or is lower than the specific reference not to be reflected in generating the path (S203).

Thereafter, when the number of times of accidents of the large vehicle 50 is five times, and when the driving tendency of the driver of the large vehicle 50 shows the carelessness at the front-right portion or the right portion, so the dangerous level of the blind spot is higher than the specific reference, the dangerous level of the blind spot may be reflected in generating the deviation path and an avoiding path (S204). When the dangerous level of the blind spot is lower than the specific reference, the dangerous level of the blind spot is not reflected in generating the deviating path and the avoiding path (S205).

Thereafter, the vehicle controller 200 may determine whether the host vehicle 100 is present in the blind spot of the large vehicle 50 (S103), and whether the path of deviating from the blind spot is generated (S104), and when the generation of the path of deviating from the blind spot is possible, the vehicle controller 200 may control the host vehicle 100 to accelerate or decelerate or to change a lane to a next lane, such that the host vehicle 100 deviates from the blind spot of the large vehicle 50 (S105).

In this case, when the host vehicle 100 travels within the blind spot of the large vehicle 50 and when the dangerous level of the blind spot and the dangerous level of the large vehicle 50 are higher than THE specific reference, the host vehicle 100 may instantly accelerate to rapidly deviate from the blind spot range.

Thereafter, when the host vehicle 100 is scheduled to enter the blind spot of the large vehicle 50 (S107), vehicle controller 200 determines whether the path of avoiding the blind spot is generated (S108). When the path of avoiding the blind spot is generated, vehicle controller 200 may control the host vehicle 100 to accelerate or decelerate or to change a lane to a next lane, such that the host vehicle 100 deviates from the blind spot of the large vehicle 50 (S109).

In this case, when the host vehicle 100 avoids the blind spot of the large vehicle 50 by passing through the blind spot of the large vehicle 50, vehicle controller 200 may determine the dangerous level of the blind spot and the dangerous level of the large vehicle 50 and may generate a path of passing through a safer blind spot.

Meanwhile, when the host vehicle 100 does not enter the blind spot or when the path of avoiding the blind spot is failed, vehicle controller 200 may control the host vehicle 100 to currently maintain an inter-vehicle distance to the large vehicle 50 and maintain a current lane (S110).

As described above, according to the present disclosure, the license plate of the large vehicle adjacently traveling may be inquired to analyze the accident history (the number of times of accidents, the type of the accident, or the scale of the accident), and the dangerous level of the large vehicle and the accident tendency of the driver may be deduced based on the analyzing result such that the dangerous level of the large vehicle and the accident tendency of the driver are reflected in generating the path of deviating from the blind spot and the path of avoiding the blind spot. Especially, the blind spot, which is formed by the large vehicle having the higher probability (the higher dangerous level) for the accident, may be more actively addressed (in terms of generating a path and controlling).

Accordingly, the safe traveling of the host vehicle may be ensured by minimizing the traveling time in the blind spot of the large vehicle traveling adjacent to the host vehicle and the dangerous level. Accordingly, the driver of the host vehicle may feel psychological safety. In addition, the collision between a general sedan (smaller sedan) and a large vehicle may be reduced and thus the death rate from a traffic accident may be reduced, thereby preventing a large-scale accident resulting from the accident with the large vehicle.

Hereinabove, although the present disclosure has been described with reference to exemplary embodiments and the accompanying drawings, the present disclosure is not limited thereto, but may be variously modified and altered by those skilled in the art to which the present disclosure pertains without departing from the spirit and scope of the present disclosure claimed in the following claims.

Therefore, the exemplary embodiments of the present disclosure are provided to explain the spirit and scope of the present disclosure, but not to limit them, so that the spirit and scope of the present disclosure is not limited by the embodiments. The scope of the present disclosure should be construed on the basis of the accompanying claims, and all the technical ideas within the scope equivalent to the claims should be included in the scope of the present disclosure.

What is claimed is:

1. A system for avoiding a blind spot using accident history information, the system comprising:
    an image sensor configured to provide image information by acquiring a surrounding image of a host vehicle; and
    a vehicle controller configured to:
        detect, through the image sensor, an adjacent vehicle traveling adjacent to the host vehicle and a license plate of the adjacent vehicle;
        determine a dangerous level of the blind spot of the adjacent vehicle, based on accident history information of the adjacent vehicle and driver tendency information of a driver of the adjacent vehicle, obtained by inquiring about the license plate of the adjacent vehicle, after determining a blind spot range of the adjacent vehicle; and
        generate a path in which the host vehicle deviates from the blind spot or avoids the blind spot to reduce the dangerous level of the blind spot, based on a traveling situation of the host vehicle,
    wherein the vehicle controller comprises
        a blind spot range generator configured to detect the adjacent vehicle traveling adjacent to the host vehicle, based on the image information received through the image sensor, and determine a default blind spot range, wherein the blind spot range generator comprises:
            a host vehicle information storage configured to store data of the host vehicle, including a total height of the host vehicle and a roof area of the host vehicle; and
            a blind spot range determining device configured to determine the default blind spot range, based on any one or any combination of any two or more of a height of the adjacent vehicle, the total height of the host vehicle, and the roof area of the host vehicle.

2. The system of claim 1, wherein the vehicle controller comprises:
    a traveling road information generator configured to provide, as traveling road information, information on a road on which the host vehicle is travelling, based on the image information;
    a blind spot range changing device configured to change the default blind spot range, based on the traveling road information;
    a blind spot dangerous level determining device configured to determine the dangerous level of the blind spot by matching a dangerous level of the adjacent vehicle, deduced by analyzing the accident history information of the adjacent vehicle and the driver tendency information of the driver of the adjacent vehicle, with the default blind spot range changed based on the traveling road information; and
    a path generator configured to generate the path for minimizing the dangerous level of the blind spot, based on the traveling situation of the host vehicle and to longitudinally or laterally control the host vehicle.

3. The system of claim 2, wherein the blind spot range generator further comprises:
    an object type determining device configured to determine a type of the adjacent vehicle, based on the image information; and
    an object size determining device configured to calculate a size of the adjacent vehicle, based on the image information.

4. The system of claim 3, wherein the blind spot range determining device:
    selects one of blind spots stored depending on types of adjacent vehicles, based on the determined type of the adjacent vehicle;
    matches the selected blind spot with the detected adjacent vehicle; and
    determines the blind spot range matched with the adjacent vehicle, based on any one or any combination of any two or more of the determined size of the adjacent vehicle, the total height of the host vehicle, and the roof area of the host vehicle to determine the default blind spot range.

5. The system of claim 2, wherein the blind spot dangerous level determining device determines the dangerous level of the blind spot by matching the dangerous level of the adjacent vehicle, deduced by using the accident history information, including a number of times of accidents, an accident type, and an accident scale, of the adjacent vehicle, and the driver tendency information of the driver of the adjacent vehicle received from an information providing server, with the default blind spot range changed based on a traveling path of the host vehicle and a traveling path of the adjacent vehicle.

6. The system of claim 5, wherein the vehicle controller is further configured to:
   accelerate the host vehicle to deviate the host vehicle from the blind spot range,
   when the dangerous level of the blind spot and the dangerous level of the adjacent vehicle are higher than a specific reference, and when the host vehicle travels within the blind spot range of the adjacent vehicle.

7. The system of claim 5, wherein the vehicle controller is further configured to:
   generate a path of passing through a safer blind spot by determining the dangerous level of the blind spot and the dangerous level of the adjacent vehicle, when the host vehicle avoids the blind spot of the adjacent vehicle by passing through the blind spot of the adjacent vehicle.

8. A method for avoiding a blind spot using accident history information, the method comprising:
   providing image information by acquiring a surrounding image of a host vehicle through an image sensor;
   detecting, by a vehicle controller, an adjacent vehicle traveling adjacent to the host vehicle and a license plate of the adjacent vehicle;
   determining a dangerous level of the blind spot of the adjacent vehicle, based on accident history information of the adjacent vehicle and driver tendency information of a driver of the adjacent vehicle obtained by inquiring about the license plate of the adjacent vehicle, after determining a blind spot range of the adjacent vehicle;
   generating a path in which the host vehicle deviates from the blind spot or avoids the blind spot to reduce the dangerous level of the blind spot, based on a traveling situation of the host vehicle; and
   detecting, by a blind spot range generator, the adjacent vehicle traveling adjacent to the host vehicle, based on the image information received through the image sensor, and determining a default blind spot range of the adjacent vehicle,
   wherein the determining of the dangerous level of the blind spot comprises:
      storing, by a host vehicle information storage, data of the host vehicle, including a total height of the host vehicle and a roof area of the host vehicle; and
      determining, by a blind spot range determining device, the default blind spot range, based on any one or any combination of any two or more of a height of the adjacent vehicle, the total height of the host vehicle, and the roof area of the host vehicle.

9. The method of claim 8, wherein the detecting, by the vehicle controller, of the adjacent vehicle comprises:
   providing, by a traveling road information generator, as traveling road information, information on a road on which the host vehicle is travelling, based on the image information,
   wherein the determining of the dangerous level of the blind spot further comprises:
      changing, by a blind spot range changing device, the default blind spot range, based on the traveling road information; and
      determining, by a blind spot dangerous level determining device, the dangerous level of the blind spot by matching a dangerous level of the adjacent vehicle, deduced by analyzing the accident history information of the adjacent vehicle and the driver tendency information of the driver of the adjacent vehicle, with the default blind spot range changed based on the traveling road information, and
   wherein the generating of the path in which the host vehicle deviates comprises:
      generating, by a path generator, a path for minimizing the dangerous level of the blind spot, based on the traveling situation of the host vehicle; and
      longitudinally or laterally controlling the host vehicle.

10. The method of claim 9, wherein the determining of the dangerous level of the blind spot further comprises:
   determining, by an object type determining device, a type of the adjacent vehicle, based on the image information; and
   calculating, by an object size determining device, a size of the adjacent vehicle, based on the image information.

11. The method of claim 10, wherein the determining of the dangerous level of the blind spot comprises:
   selecting one of blind spots stored depending on types of adjacent vehicles, based on the determined type of the adjacent vehicle;
   matching the selected blind spot with the detected adjacent vehicle; and
   determining a blind spot range matched with the adjacent vehicle, based on any one or any combination of any two or more of the determined size of the adjacent vehicle, the total height of the host vehicle, and the roof area of the host vehicle to determine the default blind spot range.

12. The method of claim 9, wherein the determining of the dangerous level of the blind spot comprises:
   determining the dangerous level of the blind spot by matching the dangerous level of the adjacent vehicle, deduced by using the accident history information, including a number of times of accidents, an accident type, and an accident scale, of the adjacent vehicle, and the driver tendency information of the driver of the adjacent vehicle, received from an information providing server, with the default blind spot range changed based on a traveling path of the host vehicle and a traveling path of the adjacent vehicle.

13. The method of claim 12, wherein the generating of the path in which the host vehicle deviates comprises:
   accelerating the host vehicle to deviate the host vehicle from the blind spot range of the adjacent vehicle,
   when the dangerous level of the blind spot and the dangerous level of the adjacent vehicle are higher than a specific reference, and when the host vehicle travels within the blind spot range of the adjacent vehicle.

14. The method of claim 12, wherein the generating of the path in which the host vehicle deviates comprises:
   generating a path of passing through a safer blind spot by determining the dangerous level of the blind spot and the dangerous level of the adjacent vehicle, when the host vehicle avoids the blind spot of the adjacent vehicle by passing through the blind spot of the adjacent vehicle.

15. The method of claim 8, wherein the adjacent vehicle is larger than the host vehicle.

16. An apparatus, comprising:
   an image sensor configured to provide image information by acquiring a surrounding image of a host vehicle; and a controller configured to:
  detect, through the image sensor, one or more adjacent vehicles traveling adjacent to the host vehicle from the surrounding image;
  determine, responsive to detecting a large vehicle among the one or more adjacent vehicles, a dangerousness level of a blind spot of the large vehicle based on a height of the large vehicle;
  determine a default blind spot range, based on a roof area of the host vehicle and a total height of the host vehicle and one or more of a type of the large vehicle and a size of the large vehicle; and
  generate a path for the host vehicle that reduces the dangerousness level of the large vehicle blind spot according to the default blind spot range.

17. The apparatus of claim 16, wherein the controller is further configured to:
  acquire license plate images of the one or more adjacent vehicles from the surrounding image;
  obtain, responsive to detecting the large vehicle among the one or more adjacent vehicles, accident history information of the large vehicle and driver tendency information of a driver of the large vehicle by inquiring about a license plate of the large vehicle; and
  determine a dangerousness level of the blind spot of the large vehicle, based on the accident history information and the driver tendency information.

18. The apparatus of claim 16, wherein the controller is configured to generate the path based on a travelling situation of the host vehicle, a host travelling path of the host vehicle, and a large vehicle travelling path of the large vehicle.

19. The apparatus of claim 16, wherein the blind spot of the large vehicle includes a left blind spot, a right blind spot, a front-right blind spot, and a rear blind spot.

20. The apparatus of claim 16, wherein the blind spot range determining device is further configured to expand or reduce a blind spot range matched with the large vehicle based on the total height of the large vehicle.

* * * * *